COMBINED DIAL AND TRANSMISSION NETWORK MOUNTING BRACKET

Filed June 10, 1957

INVENTOR.
Fredric E. Wood
BY C. R. Sipe
Atty.

United States Patent Office
2,862,063
Patented Nov. 25, 1958

2,862,063

COMBINED DIAL AND TRANSMISSION NETWORK MOUNTING BRACKET

Frederic E. Wood, McHenry, Ill., assignor to General Telephone Laboratories, Incorporated, Chicago, Ill., a corporation of Delaware Application June 10, 1957, Serial No. 664,540
11 Claims. (Cl. 179—100)

This invention relates to telephone subsets in general and more specifically to combined means for mounting a dial assembly and resiliently holding a transmision housing in a telephone subset.

The primary object of the present invention is the provision of a means whereby a dial assembly and a transmission housing are commonly held in place by a mounting bracket for properly positioning them within the subset housing, including means for easily assembling or disassembling either the dial assembly or the transmission housing to or from the subset.

A feature of the invention resides in the use of a one-piece tripod mounting bracket having a first pair of bow springs to properly position and resiliently seat a dial assembly within a housing opening provided therefor, and a second pair of bow springs on said mounting bracket for resiliently holding a transmission housing against the base place of the subset housing, with each pair of bow springs tensioning their items in opposite directions.

Another feature of the invention resides in a hinged arrangement betwen one of the legs of the mounting bracket and the base plate, to permit pivoting of the mounting bracket for inserting or removing the transmission housing to or from the subset, without requiring any screw or bolt fastening means to hold the transmission housing to the base plate, to thereby allow easy and fast assembly or dis-assembly of the transmission housing.

Another feature resides in the utilization of a stud welded to the base plate and cooperating with a slot in the transmission housing, for correctly positioning the housing on the base plate and prevent shifting thereof or breakage in the event of accidental droppage of the subset after the subset has been completely assembled.

Other objects and features of the invention will be apparent from the following description of the drawings comprising Figs. 1, 2 and 3, which show sufficient views of the mounting arrangement constructed in accordance with the invention to enable the invention to be described and understood. In the drawings.

Figures 1, 2, 3:
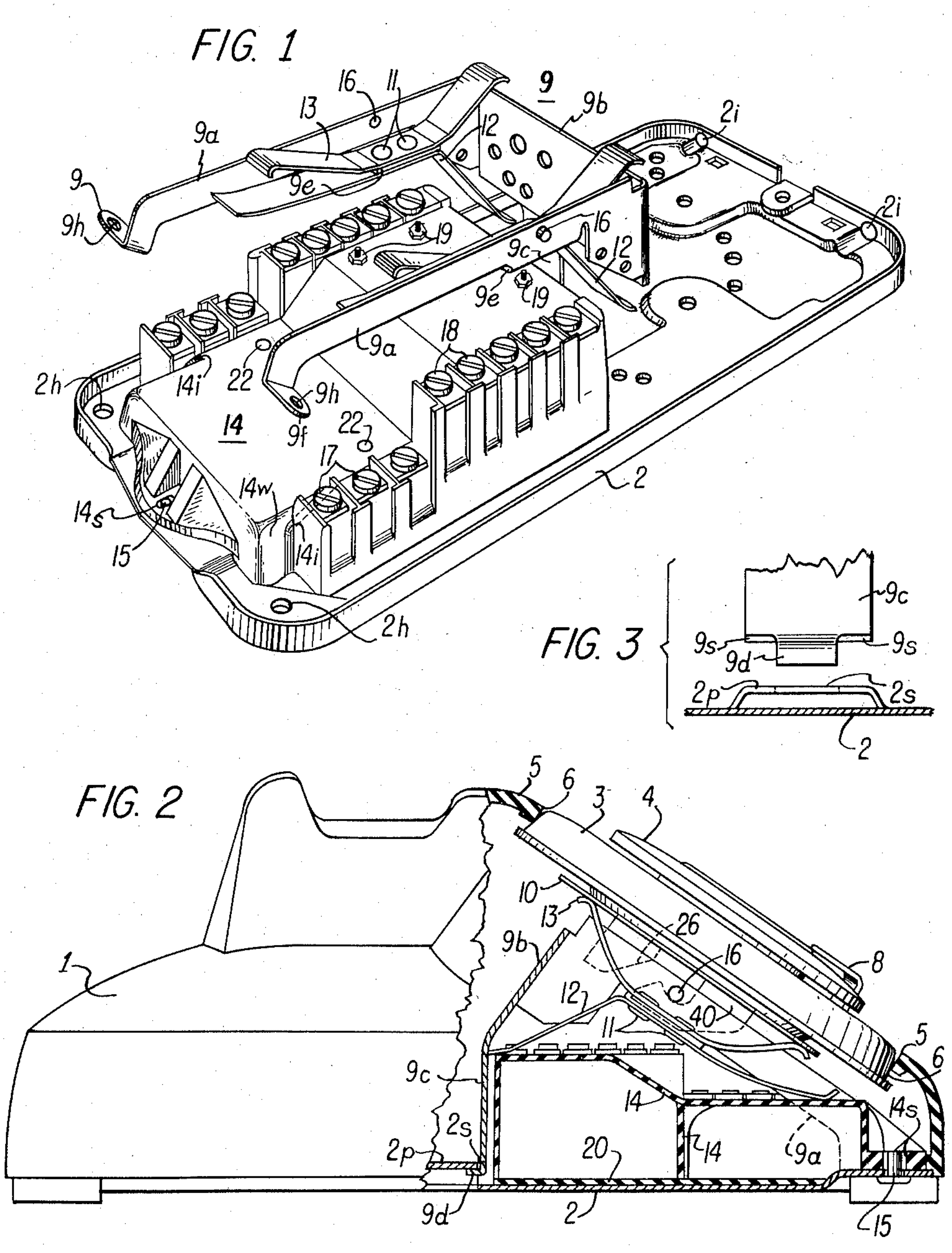
Fig. 1 shows a perspective view of the mounting bracket in a pivoted position on a base plate, and also showing the contour of a housing transmission which is resiliently held in place by a pair of bowed springs secured to said mounting bracket.
Fig. 2 shows a side view of the dial assembly and the transmission housing mounted on the base of the telephone subset and positioned within the subset housing, part of which is shown in section.
Fig. 3 shows the interlocking arrangement between one of the legs of the mounting bracket and the base plate, with portions in cross section.

In my copending application, Serial No. 603,253, filed August 10, 1956, now Patent No. 2,819,355 issued January 7, 1958, there is disclosed a dial mounting plate having bayonet slots, and a mounting bracket having cooperating studs for movably securing the dial mounting plate and a dial assembly to the mounting bracket. In this arrangement, the bayonet mounted dial plate and dial assembly can be removed in a single motion by pressing downward on the dial and at the same time pressing the dial toward the front of the telephone. It can be replaced by setting the dial plate on the front of the dial and mounting bracket and pressing downwards and towards the back of the telephone. Also, when the housing is placed on the telephone, a flange on the number plate is pushed down by the rib around the under side of the dial opening in the housing. This pushes the bayonet mounting dial bracket free of the locating pins. The tapered portion on the rim of the dial number plate moves the dial and bayonet bracket into alignment with the dial opening in the housing. The dial is thus held in position by the springs under the bayonet mounting dial bracket forcing the dial and bracket upwards until the dial number plate flange rests against the under side of the rib around the dial opening in the housing and the tapered portion on the rim of the number plate presses against the side of the rib around the dial opening, thus preventing side motion and correctly aligning the number plate. By this means, accurate alignment of the dial with the dial opening in the housing is provided regardless of manufacturing variations in metal parts or molded shells.

My above noted copending application with the features mentioned are utilized in the present invention, including modifications to include means for holding a transmission housing against the base plate, and a hinging arrangement for gaining easy access to the transmission housing for removal or insertion thereof. Also, the mounting bracket in the present invention, in comparison to the copending application, is now stamped in one piece. In the present invention, the mounting bracket has been modified to include a second pair of flat bowed springs in directional opposition to the dial assembly springs of my mentioned copending application. This second pair of bowed springs tensions the transmission housing against the base plate of the subset when the mounting bracket is fastened to the base plate, to prevent movement of the housing in one direction. Also, a stud is provided in the base plate to cooperate with a slot in the transmission housing to align the housing on a specific location on the base plate, and also prevent movement of the housing in a second direction. Further, one of the legs of the tripod mounting bracket has a hinging arrangement with the base plate, whereby the mounting bracket can be pivoted upon loosening the screws of the other two legs from the base plate. This pivoting of the mounting bracket permits the housing transmission to be inserted or removed from beneath the mounting bracket. In other words, with such an arrangement as described, the transmission housing requires no screws or bolts to hold it in a definite location on the base plate, and can be inserted or removed as desired. By this means, accurate mounting locations of a transmission housing is provided regardless of manufacturing variations in molded transmission housing shells.

Referring now to the drawings, there is shown a one-piece mounting bracket 9 having two legs **9*a* and a leg 9*c* extending from a main portion 9*b*. Each of the legs 9*a* have projections or ears 9*f*, with mounting holes 9*h* at their lower ends. Holes 9*h* are for screws (not shown) for mounting the mounting bracket 9 to the base plate 2, upon the screws being inserted and fastened within threaded holes 2*h* provided in the base plate. Leg 9*c* also has a projection 9*d* perpendicular thereto for a reason to be later explained. Each leg 9*a* also includes a mounting bracket extension 9*e* turned inwardly therefrom, whereby a pair of bowed springs 12 and 13 are fastened to each extension 9*e* by means of rivets 11. The legs 9*a* also have a pair of studs 16** fastened thereto for bayonet mounting the dial asembly as disclosed in my mentioned copending application.

A transmission housing or casing 14 is shown, which rests on the base plate 2. The transmission housing 14 contains within its shell the usual transmission network of a telephone subset, such as capacitors, resistors, induction coils, etc. (not shown). All of the mentioned items are fastened to the housing as well as to the inner wall 14*w* shown in cross section in Fig. 2, by means of screws and bolts, such as 19 and rivets, such as 22. It is to be pointed out that none of the transmission network is fastened to the base plate 2, nor is the transmission housing itself fastened to the base plate. However, an elongated slot 14*s* in the transmission housing 14 cooperates with a pin 15 secured to the base plate 2, for positioning the housing 14 in a definite location on the base plate 2. The transmission housing 14 also has a plurality of wiring terminals of the screw type along its outer edges, such as 17 and 18. The screw type terminals 17 and 18 are used to connect wires thereto, and it is to be understood that it is contemplated that wires of various diameters will be utilized in the assembly, the spacing of the respective terminals being exactly determined in each instance by the diameter and the number of the wires to be accommodated. For instance, the external cords for the telephone subset will extend through holes 2*i* in the base plate 2, and terminate in two of the mentioned screw type terminals 17 or 18.

The transmission housing 14 after securing the mentioned inner parts, is completely filled with a substance, such as a synthetic rubber compound mixed with polyethylene. This substance is rather thick and remains constant in all weather temperature changes, to act as a moisture seal. This substance also acts as a shock repellent for the mentioned inner mounted parts. In order to prevent this substance from smearing upon installing or removing the transmission network, a thin light elastic cover or plate 20 covers the bottom of the transmission housing 14. The plate 20 is held in place under the housing by the substance therein, which has a gluing effect on the very light plate 20. Also, it might be pointed out that the substance is transparent for permitting the viewing of the inner mounted members within the housing upon removing the plate 20.

In regards to the dial assembly, it is as substantially disclosed in my copending application, consisting of a tapered number plate 3 having a flange 7, a finger wheel 4 rotatably secured above said number plate 3, a finger stop 8, a dial mounting plate 10 having perpendicular projections 40 containing bayonet slots 26. As disclosed in my copending application, in order to mount the dial assembly on the mounting bracket 9, the bayonet slots 26 of the dial plate projections 40 are lowered over a pin 16, and applying manual pressure whereby dial plate 10 is pressed downward against bow springs 13 while simultaneously moving the dial toward the rear of the subset. The grooved portion of bayonet slot 26 will lie directly under stud 16, and be held thereat by the bowed springs 13 tensioning dial plate 10 and the dial assembly in an upward direction. The subset housing 1 with the dial opening 6 will then be lowered over the dial assembly whereby, the tapered rim about the number plate 6 will self-align itself within the housing opening 6, causing the front surface of the number plate 3 to be approximately flush with the front surface 5 of the housing 1. The housing 1 will then be fastened to the base plate 2 by means of screws (not shown).

*Assembling*

In assembling the subset, the transmission network is placed on the base plate with the pin 15 protruding through the elongated slot 14*s* of transmission housing 14. The mounting bracket 9 will then be placed at an angle whereby the projection 9*d* of leg 9*c* is perpendicular to the slot 2*s* on the base plate (as shown in Fig. 3), and inserted therein until the shoulders 9*s* rest upon the base plate portion adjacent each side of the slot 2*s*. The mounting bracket 9 is then pivoted toward the front of the subset whereby, the upper surface of projection 9*d* is flush with the underside of projection 2*p* of the base plate (as shown in Fig. 2). The mounting bracket is now prevented from being vertically lifted out of slot 2*s*. The mounting bracket 9 is forced downward, aligning holes 9*h* with threaded holes 2*h* on the base plate, and screws are inserted therethrough and fastened. The downward pressure applied to the mounting bracket causes the rear portions of bow springs 12 to engage and tension downward on the upper rear surface of the transmission housing 14, and simultaneously causes the front portions of bow springs 12 to engage and tension downwards on the lower front surface of the transmission housing. When the mounting bracket 9 is fastened to the base plate 2, the legs 9*a* overlap the angular indentations or recesses 14*i* provided in the housing 14, and the legs lie adjacent the outer walls 14*w* to prevent side movement of the transmission network. Thus, the downward pressure applied by the bowed springs 12 and the overlapping by the mounting bracket legs 9*a* in combination with the pin 15 protruding through the elongated slot 14*s*, transmission housing 14 is prevented from movement in every direction without actually requiring any fastening means.

The dial mounting plate 10 with the dial assembly secured thereto is lowered by way of the openings in the bayonet slots 26 over the stud 16, with the projections 40 overlapping the mounting bracket legs 9*a*. Plate 10 is lowered until the ends of the bow springs 13 make contact with mounting plate 10 and until the openings of the bayonet slots are opposite the studs 16. At this point, simultaneous downward pressure is applied to the dial assembly, and a movement toward leg 9*c* is applied, to cause dial plate 10 to force the bow springs 13 to spread and tension, and allow the humps of bayonet slots 26 to go under studs 16. The pressure is then released to cause the tension in the bowed springs 13 to force the dial assembly upward, and force the grooved portion of the bayonet slots 26 to engage the studs 16. The dial assembly is now movably and resiliently mounted on the mounting bracket 9, which in turn is mounted on the base.

The mounting of the subset housing 1 and the cooperation between the housing and the dial assembly is disclosed in my copending application, and therefore a detailed explanation is not considered necessary. However, it will be pointed out that the bow springs 13 will tension the dial assembly upwards within the dial opening provided in the subset housing 1, and the bow springs 12 will tension the transmission housing 14 downward against the base. In other words, each set of bow springs tension and movably secure their individual items in opposite directions.

It thus becomes quite apparent that once the subset housing 1 is removed from the base, the dial assembly, the mounting bracket 9, and the transmission network can be completely removed and disassembled from the subset by merely removing the two screws securing the mounting bracket to the base plate. For instance, when the mentioned screws are removed, the mounting bracket 9 is pivoted by the mentioned hinging arrangement and the transmission network is slipped out. This could be accomplished without necessitating the removal of the dial assembly from the mounting bracket.

Attention should also be called to the main purpose of pin 15 and elongated slot 14*s*. Should the assembled telephone subset be accidentally dropped, the pin 15 would prevent the thin housing 14 from shifting sideways which prevents the indentated outer walls 14*w* from hitting against the adjacent legs 9*a* of the mounting bracket 9 during the concussion. Also, the tension applied to the housing 14 by bowed springs 12 prevents an extensive upward movement of the housing, while a certain resiliency in the springs permits a slight movement which is needed to prevent breakage during the concussion.

While one embodiment of the invention has been disclosed, it will be understood that various modifications may be made therein which are within the true spirit and scope of the invention.

What is claimed is:

1. In a telephone subset, a base plate, a one-piece mounting bracket comprising two front legs and a rear leg, feet on said two front legs for securing said mounting bracket to said base plate, a foot on said rear leg cooperating with a slot in said base plate for permitting pivotal movement of said mounting bracket, a transmission housing containing a transmission network secured therein, a bow spring attached to each of said front legs adapted to engage said transmission housing and resiliently hold said housing against said base plate beneath said mounting bracket, wherein said transmission housing and network is held in position on said base plate without utilizing any screw or bolt fastening means between the base plate and said transmission housing.

2. In a telephone subset, a base plate, a one-piece mounting bracket comprising two front legs and a rear leg, feet on said two front legs for securing said mounting bracket to said base plate, a foot on said rear leg cooperating with a slot in said base plate for permitting pivotal movement of said mounting bracket, a transmission housing containing a transmission network secured therein, a bow spring attached to each of said front legs adapted to engage said transmission housing after pivoting said mounting bracket for permitting insertion of said transmission housing on said base plate and under said two front legs, said bow springs resiliently holding said transmission housing downward against said base plate responsive to securing said two front legs of said mounting bracket to said base plate, and indentations in said transmission housing for permitting said two front legs to adjacently overlap outer walls on said housing to permit limited movement of said housing in a sideward direction.

3. In a telephone subset as claimed in claim 2, a second pair of bow springs attached to each of said front legs adapted to engage a dial assembly, a subset housing including a dial opening therein, and means responsive to securing said subset housing to said base plate for resiliently holding said dial assembly within said subset housing opening.

4. In a telephone subset, a base plate, a one-piece mounting bracket comprising two front legs and a rear leg, feet on said two front legs for securing said mouting bracket to said base plate, a foot on said rear leg cooperating with a slot in said base plate for permitting pivotal movement of said mounting bracket, a transmission housing containing a transmission network secured therein, said transmission housing permitted insertion beneath said mounting bracket responsive to pivoting said mounting bracket in one direction, a bow spring attached to each of said front legs adapted to engage said transmission housing and resiliently hold said housing downward against said base plate responsive to pivoting said mounting bracket in an opposite direction and securing said front legs to said base plate, whereby easy accessibility to said transmission housing is provided.

5. In a telephone subset, a base plate, a one-piece mounting bracket comprising two front legs and a rear leg, fastening means securing said two front legs to said base plate, means for pivotally securing said rear leg to said base plate, a transmission housing containing a transmission network secured therein, a bow spring attached to each of said front legs engaging and tensioned to forcibly hold said transmission housing downward against said base plate and beneath said two front legs, and an elongated slot in said housing and a pin secured to said base plate protruding therethrough for stabilizing said housing on said base plate.

6. In a telephone subset as claimed in claim 5, a second pair of bow springs attached to each of said front legs, a dial assembly, means for bayonet mounting said dial assembly to said mounting bracket wherein said second pair of bow springs resiliently hold said dial assembly on said mounting bracket in a direction opposite to said transmission housing.

7. In a telephone subset as claimed in claim 6, said second means permitting pivoting of said mounting bracket responsive to manual opening of said fastening means for allowing manual removal or access to said transmission network without necessitating the removal of said dial assembly from said mounting bracket.

8. In a telephone subset, a base plate, a one-piece mounting bracket comprising two front legs and a rear leg, feet on said two front legs for securing said mounting bracket to said base plate, means for pivotally securing said rear leg to said base plate, a transmission housing containing a transmission network secured therein, a dial assembly, a first pair of bow springs with one of each attached to one of each of said front legs and facing in a first direction, a second pair of bow springs with one of each attached to one of each of said front legs and facing in a second direction, said first pair of bow springs tensioning to forcibly hold said transmission housing in said first direction against said base plate directly beneath said mounting bracket, a subset housing having a dial opening therein, means for bayonet mounting said dial assembly on said mounting bracket, and said second pair of bow springs tensioning said dial assembly in said second direction to resiliently seat said dial assembly within said subset housing dial opening responsive to fastening said subset housing to said base plate.

9. In a telephone subset, a base plate, a one-piece mounting bracket comprising two front legs and a rear leg, feet on said two front legs for securing said mounting bracket to said base plate, means for pivotally securing said rear leg to said base plate, a transmission housing containing a transmission network secured therein, a dial assembly, a first pair of bow springs oppositely disposed on one of said front legs, a second pair of bow springs oppositely disposed on the other of said front legs, one of each pair of bow springs tensioning to forcibly hold said transmission housing in a first direction against said base plate directly beneath said mounting bracket, a subset housing having a dial opening therein, means for bayonet mounting said dial assembly on said mounting bracket, and the other of each pair of bow springs tensioning said dial assembly in a direction in opposition to said first direction to resiliently seat said dial assembly within said subset housing dial opening responsive to fastening said subset housing to said base plate.

10. In a telephone subset, a base plate, a one-piece mounting bracket comprising two front legs and a rear leg, feet on said two front legs for securing said mounting bracket to said base plate, means for pivotally securing said rear leg to said base plate, a transmission housing having a transmission network secured therein, a plurality of screw type terminals disposed in columns on the outer walls along the longitudinal axis of said housing for connection to the individual components of the transmission network, a bow spring attached to each of said front legs adapted to engage said transmission housing and resiliently hold said housing against said base plate and beneath said mounting bracket, indentations in said transmission housing for adjacently accepting said front legs and permitting said terminals to lie outside said front legs, whereby external wiring can be connected to said screw type terminals without necessitating the removal of said mounting bracket, and a stud on said base plate protruding through an elongated slot in said transmission housing for preventing said front legs from damaging said columns of terminals in the event of a concussion occurring during droppage of said subset.

11. In a telephone subset, a base plate, a one-piece mounting bracket comprising two front legs and a rear leg, feet on said two front legs for securing said mounting bracket to said base plate, a projection on said rear leg and perpendicular thereto, a slot in said base plate for permitting the insertion of said projection upon the projection being inserted at a first angle, said projection prevented removal from said slot responsive to pivoting said mounting bracket within said slot in a certain direction, a transmission housing having a transmission network secured therein, a bow spring attached to each of said front legs adapted to engage said transmission housing, said front legs manually secured to said base plate responsive to manually pivoting said mounting bracket to a second angle, wherein said projection of said rear leg lies parallel beneath said base plate to prevent movement of said mounting bracket and said bow springs tension said transmission housing against said base plate to prevent excessive movement thereof.

No references cited.